United States Patent [19]

Colin

[11] Patent Number: 4,844,626

[45] Date of Patent: Jul. 4, 1989

[54] ROLLER WITH THRUST BEARING CAGE

[76] Inventor: George M. Colin, 32072 Sea Island Dr., Laguna Niguel, Calif. 92677

[21] Appl. No.: 247,936

[22] Filed: Sep. 22, 1988

[51] Int. Cl.$^4$ .................. F16C 21/00; F16C 17/04; F16C 33/46

[52] U.S. Cl. .................. 384/127; 384/420; 384/452; 384/574; 384/579

[58] Field of Search ........ 384/126, 127, 420, 424–427, 384/445, 452, 548, 551, 559, 560, 564, 567, 572, 574, 578, 579, 618, 624

[56] References Cited

U.S. PATENT DOCUMENTS

| 91,695 | 6/1869 | Wilcox | 384/578 |
|---|---|---|---|
| 197,289 | 11/1877 | Peters | 384/578 |
| 458,520 | 8/1891 | Cooke | 384/574 |
| 664,821 | 12/1900 | Perkins | 384/574 |
| 681,549 | 8/1901 | Holt | 384/574 |
| 869,217 | 10/1907 | Stratton | 384/574 |
| 2,696,411 | 12/1954 | Kircher | 384/127 |
| 2,782,080 | 2/1957 | Norton | 384/578 |
| 2,950,151 | 8/1960 | Clark et al. | 384/578 |
| 3,596,533 | 8/1971 | Nightingale | 384/127 X |
| 3,647,273 | 3/1972 | Phaffenberger | 384/578 |
| 3,944,307 | 3/1976 | Bingle | 384/578 |

Primary Examiner—Thomas R. Hannon
Attorney, Agent, or Firm—Roth & Goldman

[57] ABSTRACT

Axial loads are absorbed in a roller bearing assembly by elastic axial deformation of the bell members of the bearing cage to avoid imposing axial loads on the roller bearings.

7 Claims, 3 Drawing Sheets

ROLLER WITH THRUST BEARING CAGE

CROSS REFERENCE TO RELATED APPLICATIONS, IF ANY

None.

BACKGROUND OF THE INVENTION AND PRIOR ART

Roller bearing assemblies comprised of a plurality of cylindrical rollers arranged in a circle and supported by a roller cage supporting the rollers at either end of the bearing assembly are well known. Most such bearing assemblies are designed to transfer radial but not axial loading. Bearings which are designed for the transfer of both radial as well as axial loads are known as thrust bearings. Known thrust bearings rely, at least in part, upon the rollers themselves to transfer axial loads on the assembly.

The prior art, such as discussed below, discloses various ways to decrease the friction between the roller bearings and the bearing cage or shaft caused by radial loads. While these designs may be suitable to reduce the roller wear caused by radial loads placed on rollers, none shows how to prevent roller wear caused by axial loads.

U.S. Pat. No. 91,695 (Wilcox) discloses a bearing cage which consists of several sections, which form a circle when assembled in a shafting box.

U.S. Pat. No. 197,289 (Peters) shows a typical roller bearing cage of rigid design wherein the two parallel ends of the cylindrical shaped cage are held together by connecting rods. The rollers are mounted on axles extending between the ends of the cage.

U.S. Pat. No. 458,520 discloses typical roller bearings and cage, wherein the rollers are mounted on pins which extend from both ends of the cage, rather than on continuous axles.

U.S. Pat. No. 664,821 (Perkins) discloses locking devices to keep the ends of a roller bearing cage from separating once assembled and in operation.

U.S. Pat. No. 681,549 (Holt) discloses the use of segmented rollers, wherein several separate rollers share the same axis of rotation, but are capable of independent rotation.

U.S. Pat. No. 869,217 (Stratton) discloses the placement of spacing rollers in between the bearing rollers. The ends of the spacing rollers and bearing rollers are beveled to reduce the frictional contact with the ends of the cage. The spacing rollers do not contact either inner surface of the roller bearing cage, or the shaft or axle upon which the cage is mounted.

U.S. Pat. No. 2,782,080 (Norton) discloses cylindrical rollers which taper off in a conical fashion near their ends then form a pin or tongue. The rollers are mounted within the cage by fitting the pins at the ends of the rollers into corresponding openings in the ends of the cage. Norton also shows that the bearing cage can be constructed as a split ring which can be easily closed and fitted around a shaft.

U.S. Pat. No. 2,950,151 (Clark et al.) discloses cylindrical rollers which are held in place without the use of axles or pins. Fingers separate the roller bearings while holding the bearings in place. The fingers also serve to connect the two ends, or collars of the bearing cage.

U.S. Pat. No. 3,647,273 (Phaffenberger) discloses spacing bars with curved surfaces which come into contact with, and separate the roller bearings. The spacing bars also connect the opposite ends of the bearing assembly.

U.S. Pat. No. 3,944,307 (Bingle) discloses a bearing cage design suitably manufactured out of plastics in which the rods or ribs which connect the two opposite ends of the bearing cage are at one end integrally molded to the cage. The other end of these ribs will be welded to the bearing cage once it is assembled.

The present invention is therefore intended to prevent the axial loads from being absorbed by the rollers since shear stresses on the roller surface results in inordinate wear and requires more frequent replacement of the rollers.

SUMMARY OF THE INVENTION

In the present invention axial loading on the rollers is prevented by a novel cage and housing construction which prevents contact between the insides of the end walls of the bearing housing and the outside ends of the rotating cage. The cage itself is compressible in the axial direction of the bearing assembly and transfers the axial forces induced by relative axial movement of the axle upon which the bearing assembly is mounted and the axle housing. It will be appreciated that the axle upon which the bearing assembly is mounted may comprise a rotating or a non-rotating axle and that the housing bearing itself may be either a fixed housing or the housing itself may rotate relative to the axle such, for example, as when a wheel is mounted on the housing.

BRIEF DESCRIPTION OF THE INVENTION

DESCRIPTION OF THE PREFERRED EMBODIMENT

Figure 1:
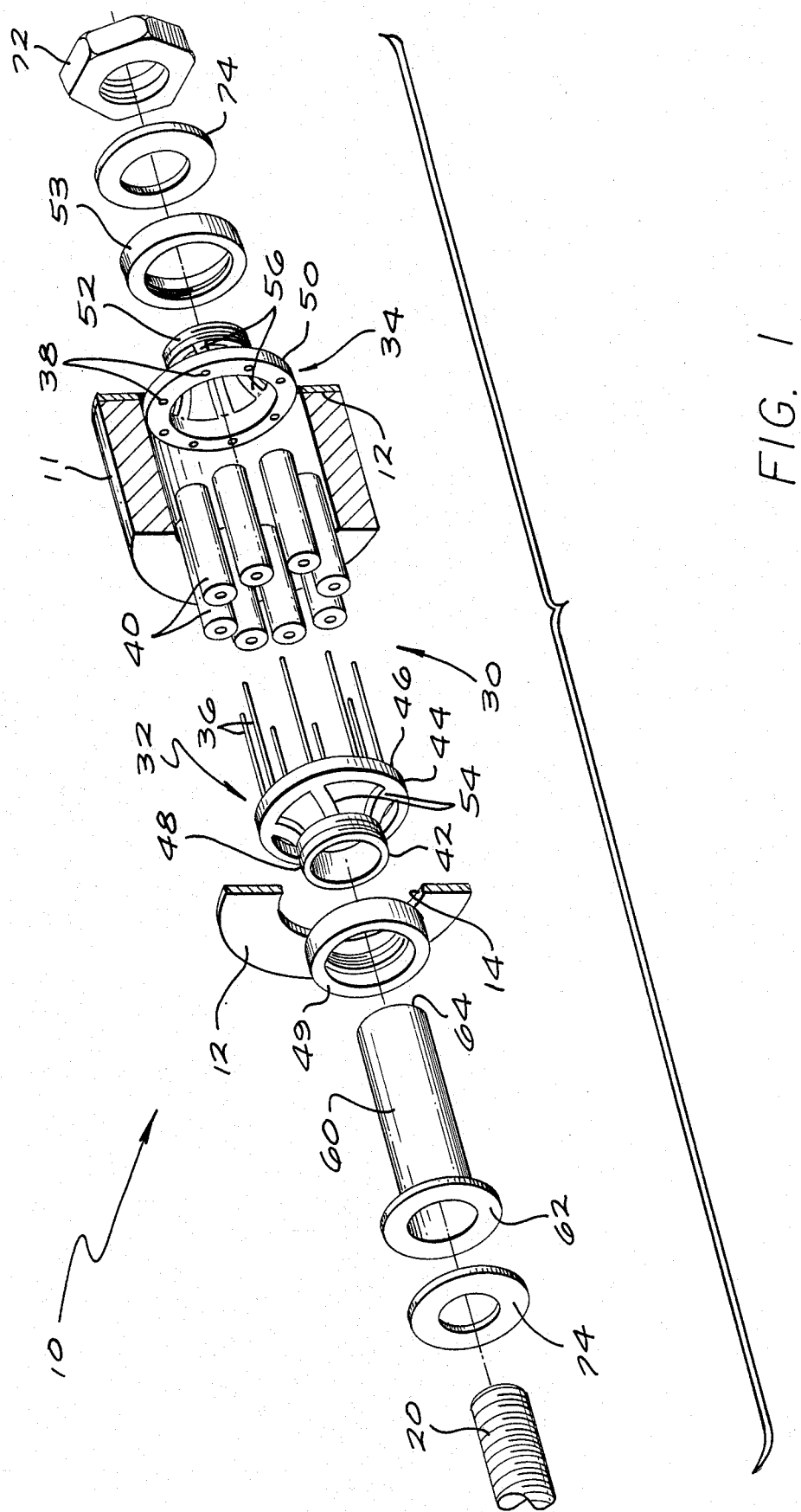
FIG. 1 is an exploded perspective view of a single roller bearing assembly constructed according to the present invention.

Throughout the description of the preferred embodiment and its operation, reference will be made to left and right hand parts as seen in the drawings; however, such reference is for ease of description and it will be appreciated that such does not constitute a limitation.

As seen in FIG. 1, a bearing assembly is comprised of a cylindrical bearing housing 10 having a radially extending rigid disc 12 at either end thereof, each disc 12 having a centrally disposed circular opening 14 therein for reception of the axle 20 on which the bearing assembly is to be mounted. A roller bearing cage 30 is centrally mounted in the housing and is comprised of left hand and right hand bell members 32, 34. As shown the left end bell member 32 has a plurality of integrally formed circumferentially equally spaced parallel roller axles 36 projecting therefrom. The right end bell member 34 is formed with a plurality of parallel equally spaced bores 38 which receive the right ends of the roller axles 36. A cylindrical roller 40 is mounted on each roller axle 36 for free rotation relative thereto, the spacing between the inner opposed faces 42,44 of the left and right bell members being greater than the axial length of the rollers 40.

Both the left end bell member 32 and the right end bell member 34 have a mouth end and a truncated end which are respectfully comprised of axially spaced inner rings 46, 50 and outer rings 48, 52 which in turn are connected together by bent resilient spokes 54, 56 whereby the spacing between the inner and outer rings is variable under applied axial loading. The outer rings 48, 52 each have a closure ring 49, 53 affixed thereto by any suitable means such as a threaded or glued connection at their juncture. The bell members 32,34 and roller axles 36 are conveniently formed by injection molding M 90 CELCON plastic which has been found to possess the required properties of strength, lubricity and resilience of the spokes 54,56. The rollers 40 may be comprised of a relatively harder plastic such as M 25 CELCON or of stainless steel. The CELCON plastics are available from the Celanese Corporation.

The bearing housing 10 is preferably comprised of a cylindrical tubular section 11 and two rigid discs 12 at the ends, the discs 12 being glued, threadedly connected or welded to the ends of the tubular section 11 as shown. If desired, the tubular section 11 and one disc 12 can be formed as an integral unit, and the other disc 12 assembled therewith.

A bearing assembly is put together generally as follows:

(a) individual rollers 40 are placed onto the roller axles 36 of the left hand bell member 32;

(b) the right end bell member 34 is assembled with the bores 38 receiving the projecting ends of the roller axles 36;

(c) the assembled cage 30 and rollers 40 is inserted into the bearing housing 10, one end, e.g. the left left hand end, of which has been left open for this purpose with the outer ring 52 of, e.g. the right hand bell member 34 extending through the opening 14 in the right end disc 12;

(d) right end closure ring 53 is affixed preferably by a threaded connection to the projecting end of the outer ring 52 of the bell member 34;

(e) the housing 10 is then closed by affixing the left end disc 12 of the housing 10 to the open left end of the tubular section 11 with the outer ring 48 of the left hand bell member 32 projecting through the opening 14 in the left end disc 12;

(f) left end closure ring 49 is affixed to the projecting end of the outer ring 48 of the bell member 32.

Figure 2:
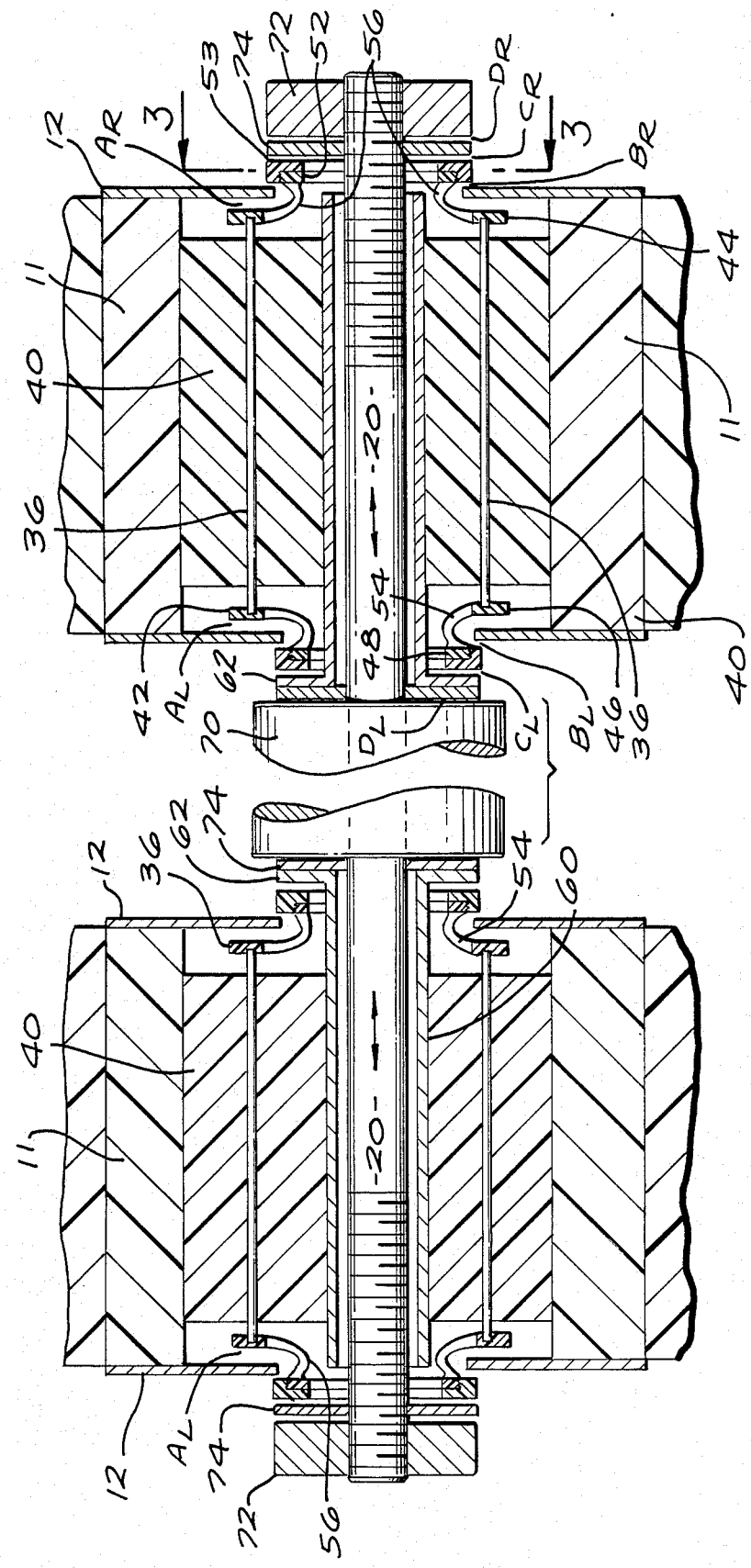
FIG. 2 is side elevation in sectional view of a pair of the roller bearing assemblies of FIG. 1 on a common axle.
Figure 3:
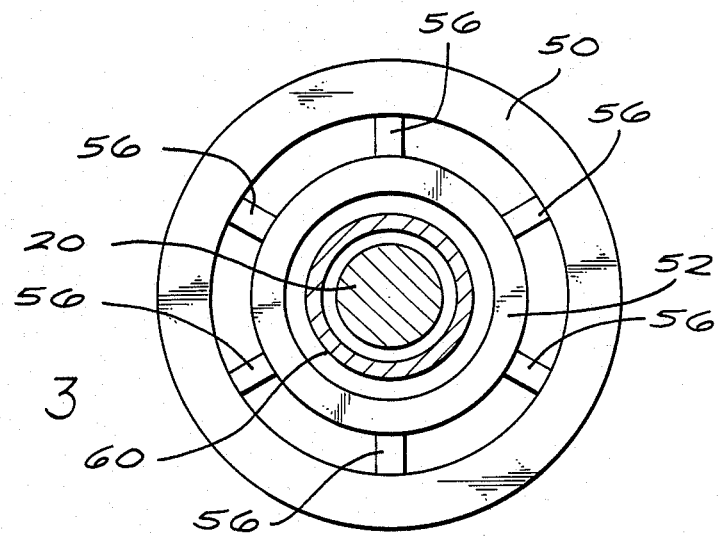
FIG. 3 is an end view of a first embodiment of a bell member which is one end of a bearing cage, the bell member having a plurality of radially spaced compression spokes.

The assembly is then ready for mounting onto an axle 20 or shaft as seen in FIG. 2 which shows two bearing assemblies mounted on the axle 20 and spaced from each other by a central axle bearing 70. If desired, a sleeve 60 having a smooth outer bearing surface for contact with the rollers 40 may be provided particularly if the outer surface of the axle 20 is rough or threaded. The sleeve 60, if used, has a flange 62 at one end and is free to slide axially along the axle 20. The end 64 of the sleeve remote from the flange 62 is disposed between the flexible spokes 54 for a purpose to be described.

Each bearing assembly is held on the axle 20 between the axle bearing 70 and a nut 72 threadedly affixed to the free end of the shaft. Spacer washers 74 are preferably provided at either end of the assembly.

RELATIVE AXIAL MOVEMENT BETWEEN THE AXLE AND AXLE BEARING

Reference is made to the dimensions shown on the right end bearing assembly in FIG. 2, it being understood that the mode of operation of the left end bearing assembly is essentially the complement of the description of operation of the right end bearing assembly. As shown, A represents the normal axial clearance between the outer surface of the large inner ring 50 of the right hand bell member 34 and the inner wall of the end disc 12 of the housing 10; B represents the normal clearance between the outer face of the housing disc 12 and the inner face of the small outer ring 52 of the bell member 34; C represents the normal clearance between the outer surface of the bell member closure ring 53 and the spacer washer 74; and D represents the normal clearance between the spacer washer 74 and the nut 72. The dimensions are selected such that $A > B + C + D$.

Subscripts L and R respectively designate the dimensions at the left and the right ends of the right end bearing assembly as seen in FIG. 2. If the axle 20 and attached nut 72 move to the left relative to the axle bearing 70 as seen in FIG. 2, first dimension $D_R$ tends to 0, then dimension $C_R$ tends to 0 and finally dimension $B_R$ tends to 0. As $B_R$ becomes 0, the cage 30 begins to move to the left with a resulting reduction in dimension $A_L$ which, however, never becomes 0 thus allowing for a continuous clearance to exist between the roller cage 30 and the disc 12. This clearance $A_L$ prevents the housing 10 from transmitting axial compressive force to the rollers 40 or the roller axles 36. As axle 20 continues to move left relative to the housing 10, $C_L$ then goes to 0, and the spokes 54, 56 begin to flex allowing the cage to axially compress and cushion the axial forces imparted thereto by the axle movement. The rollers 40 remain unaffected by the axial stresses caused by the relative movement of the axle 20 and axle bearing 70 which is transmitted by the roller axles 36 rather than by the rollers 40 themselves. As dimension $C_R$ becomes 0, friction is induced between rotatable closure ring 53 and adjacent spacer washer 74. To minimize this friction, preferably the cage 30 may be made of a material such as Teflon (Trademark) and washer 74 of smooth metal such as stainless steel.

Figure 4A:
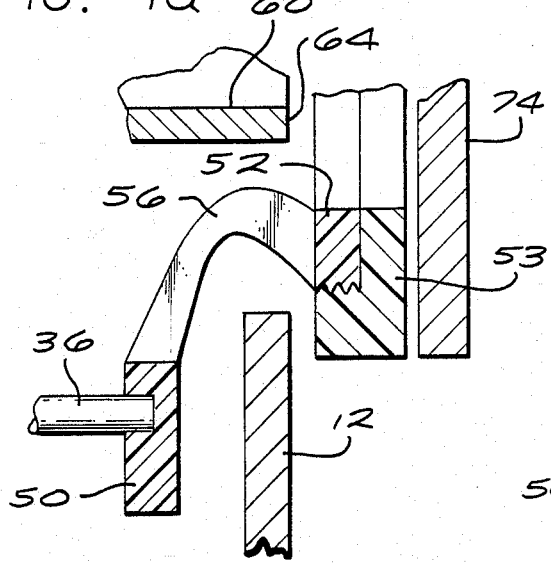
FIGS. 4a and 4b are side sectional views of the bell member of FIG. 3 respectively showing the uncompressed and the compressed positions of the bell member relative to the bearing housing.
Figure 4B:
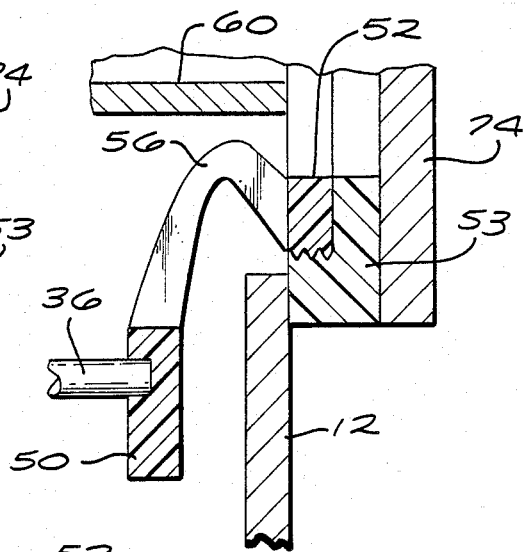

As best seen by comparing FIG. 4a with FIG. 4b, even when the cage 30 is fully compressed, the right end spacer washer 74 does not contact the end 64 of the sleeve 60, if used. If a limit is desired for the axial flexing of the cage 30, for example to prevent overstressing or breakage, a sleeve 60 will be purposely used and dimensioned to the proper length such that the washer 74 will abut the end 64 of the sleeve 60 when the cage 30 is compressed to the maximum extent allowable.

RELATIVE AXIAL MOVEMENT BETWEEN THE AXLE AND BEARING HOUSING

If the right end bearing housing 10 moves to the right as seen in FIG. 2, first $B_R$ tends to 0, the $C_R$ tends to 0, then $D_R$ tends to 0 at which time the axial stress is transmitted to the axle 20 by the nut 72. The rotation of the cage is not impaired by the reduction of dimensions $B_R$, $C_R$ and $D_R$ to 0, because of the above relationship $A > B + C + D$. Also, under these conditions, the cage 30 does not flex or compress. There is some contact between the disc 12 and the closure ring 53. In practice, such contact has minimal effect on the rotation of the bearing housing 10 on cage 30 because roller bearings have a tendency to center themselves when operating on a horizontal axis at high speed and under radial load. Movement of the axle 20 to the right is limited by the left end bearing assembly on the axle 20.

Figure 5:
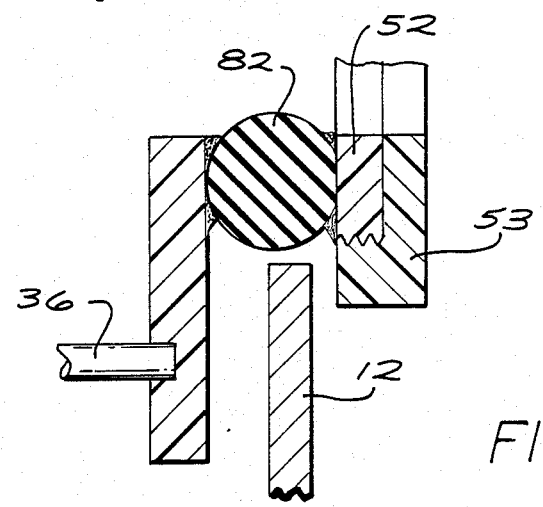
FIG. 5 is a side view of a second embodiment of a compressible bell member.

FIG. 5 shows a modified embodiment in which resilient compressible O-Rings 80, 82 are substituted in place of the flexible spokes 54 in the bell members 32, 34. O-Ring 80 is cemented or glued between the left bell member inner and outer rings 46, 48 and O-ring 82 is connected between the right bell member inner and outer rings 50, 52 as shown. Axial forces will cause O-Rings 80, 82 to compress, thus keeping axial stresses from being transferred to the rollers 40.

Persons skilled in the art will readily appreciate that various modifications can be made from the preferred embodiment thus the scope of protection is intended to be defined only by the limitations of the appended claims.

I claim:

1. A roller bearing assembly capable of absorbing radial and axial loads comprising:
   (a) a bearing housing having an inner cylindrical surface;
   (b) a radially inwardly extending end member at each end of the bearing housing;
   (c) an opening in the center of each end member, for receiving a machine part upon which bearing assembly is mountable for rotation relative thereto; and
   (d) a free wheeling bearing cage positioned within said housing, said bearing cage comprising:
      (1) a pair of spaced apart bell members, each bell member having a mouth end and a truncated end, the mouth ends being positioned to face each other;
      (2) a radially outwardly extending flange surrounding the mouth of each bell member, the diameter of each radial flange being less than the diameter of the inner cylindrical surface of said housing;
      (3) a plurality of circumferentially spaced roller axles extending between the respective radial flanges of the bell members;
      (4) a roller bearing rotatably mounted on each roller axle, the outer periphery of each roller bearing engaging the inner cylindrical surface of said housing;
      (5) the truncated end of each bell member projecting axially through the opening in the respective end member of said housing; and
      (6) an axially outwardly facing bearing surface on the truncated end of each bell member.

2. The roller bearing of claim 1, wherein the mouth end and the truncated end of each bell member are interconnected by means to compress axially of the bearing under axial load.

3. The bearing of claim 2, wherein said means to compress axially comprises flexible spokes.

4. The bearing of claim 2, wherein said means to compress axially comprises a resilient O-ring.

5. The bearing of claim 1, including a sleeve engagable with said roller bearings and for receiving said machine part, said sleeve extending axially through the openings in at least one end member of said housing.

6. The bearing of claim 1, wherein each said bell member has one surface spaced axially from the inner surface of the adjacent end member, each said bell member having a second surface adapted to be spaced axially from the outer surface of the adjacent end member, the axial spacing between said one surface and the inner surface of the adjacent end member being greater than the axial spacing between the second surface and the outer surface of the adjacent end member, whereby upon any axial relative movement between said bearing housing and said cage, contact between said second surface and the outer surface of the adjacent end member will first take place thereby preventing contact between said one surface and the inner surface of the adjacent end member of the housing.

7. The bearing of claim 6, further comprising a closure ring removably affixed to said truncated end of said bell member, said closure ring providing said second surface.

* * * * *